(12) United States Patent
Schneider

(10) Patent No.: US 11,603,156 B2
(45) Date of Patent: Mar. 14, 2023

(54) DEPLOYABLE WINDSCREEN FOR A MOTOR VEHICLE

(71) Applicant: AUTOLIV ASP, INC., Ogden, UT (US)

(72) Inventor: David Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 139 days.

(21) Appl. No.: 17/192,181

(22) Filed: Mar. 4, 2021

(65) Prior Publication Data
US 2022/0281547 A1 Sep. 8, 2022

(51) Int. Cl.
*B62J 17/04* (2006.01)
*B60J 1/00* (2006.01)
*B60J 1/02* (2006.01)
*B62J 27/00* (2020.01)

(52) U.S. Cl.
CPC ............... *B62J 17/04* (2013.01); *B60J 1/004* (2013.01); *B60J 1/02* (2013.01); *B62J 27/00* (2013.01)

(58) Field of Classification Search
CPC ... B62J 17/04; B62J 27/00; B60J 1/004; B60J 1/02
USPC ........................................................ 296/84.1
See application file for complete search history.

(56) References Cited

U.S. PATENT DOCUMENTS

| | | | | |
|---|---|---|---|---|
| 7,604,279 | B2 * | 10/2009 | Masuda | B62J 17/04 296/78.1 |
| 8,245,809 | B2 * | 8/2012 | Spence | B60J 1/00 180/282 |
| 9,908,494 | B2 | 3/2018 | Kolatschek et al. | |
| 2008/0111392 | A1 | 5/2008 | Masuda et al. | |
| 2009/0195011 | A1 * | 8/2009 | Tsuda | B62J 17/04 296/78.1 |

FOREIGN PATENT DOCUMENTS

| | | |
|---|---|---|
| DE | 10325219 A1 | 12/2004 |
| DE | 102004009248 A1 | 9/2005 |
| JP | H05254470 A | 10/1993 |

OTHER PUBLICATIONS

International Search Report and Written Opinion regarding International Application No. PCT/US2022/015752, dated May 4, 2022.

* cited by examiner

Primary Examiner — D Glenn Dayoan
Assistant Examiner — Dana D Ivey
(74) Attorney, Agent, or Firm — Harness, Dickey & Pierce, P.L.C.; Stephen T. Olson

(57) ABSTRACT

A windscreen arrangement for a motor vehicle includes a windscreen and a mounting arrangement. The mounting arrangement is operative to mount the windscreen to a body of the motor vehicle for deployment from a first position to a second position. In the second position, the windscreen is upwardly displaced from the first position.

18 Claims, 4 Drawing Sheets

DEPLOYABLE WINDSCREEN FOR A MOTOR VEHICLE

FIELD

The present disclosure generally relates to a deployable windscreen for a motor vehicle, including but not limited to powered two wheeled vehicles and powered three wheeled vehicles. The present disclosure also relates to a method of protecting a rider of a motor vehicle with a deployable windscreen.

BACKGROUND

This section provides background information related to the present disclosure which is not necessarily prior art.

Powered two-wheelers and powered three-wheelers (collectively PTWs) include mopeds, scooters, two wheeled motorcycles, three wheeled motor cycles and the like. PTWs are popular for their flexibility, affordability, and energy efficiency, among other attributes. A driver or a passenger of a PTW, however, is exposed to the environment and presented with increased risks as compared to an enclosed motor vehicle.

It is generally known in the art to provide a motor vehicle such as a PTW with a windscreen or windshield. A windscreen can help the rider to combat fatigue, back pain and arm strain by removing wind force. Less air pushing against the rider generally results in a more comfortable and enjoyable ride. A windscreen may also protect the rider from stones and the like, and may provide a small degree of protection to the rider in the event of an accident.

While windscreens for motor vehicles may have generally proven to be suitable for their intended uses, a continuous need for improvement to occupant protection in the relevant art remains.

SUMMARY

This section provides a general summary of the disclosure, and is not a comprehensive disclosure of its full scope or all of its features.

It is a general object of the present teachings to provide a windscreen for a motor vehicle, such as but not limited to a PTW, that is deployable from a normal use position to a deployed position to better protect a rider in the event of an accident event.

In accordance with one particular aspect, the present teachings provide a windscreen arrangement for a motor vehicle. The windscreen arrangement includes a windscreen and a mounting arrangement. The mounting arrangement is operative to mount the windscreen to a body of the motor vehicle for deployment from a first position to a second position. In the second position, the windscreen is upwardly displaced from the first position.

In accordance with another particular aspect, the present teachings provide a windscreen arrangement in combination with a motor vehicle. The windscreen arrangement includes a windscreen, a mounting arrangement, and a pyrotechnic arrangement. The mounting arrangement connects the windscreen and a body of the motor vehicle for movement from a first position to a second position. The mounting arrangement includes at least one telescoping assembly having a first portion mounted to a body of the motor vehicle and a second portion mounted to the windscreen. The pyrotechnic arrangement is operative to automatically deploy the windscreen from the first position to the second position in response to a predetermined accident event.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

Figure 1:
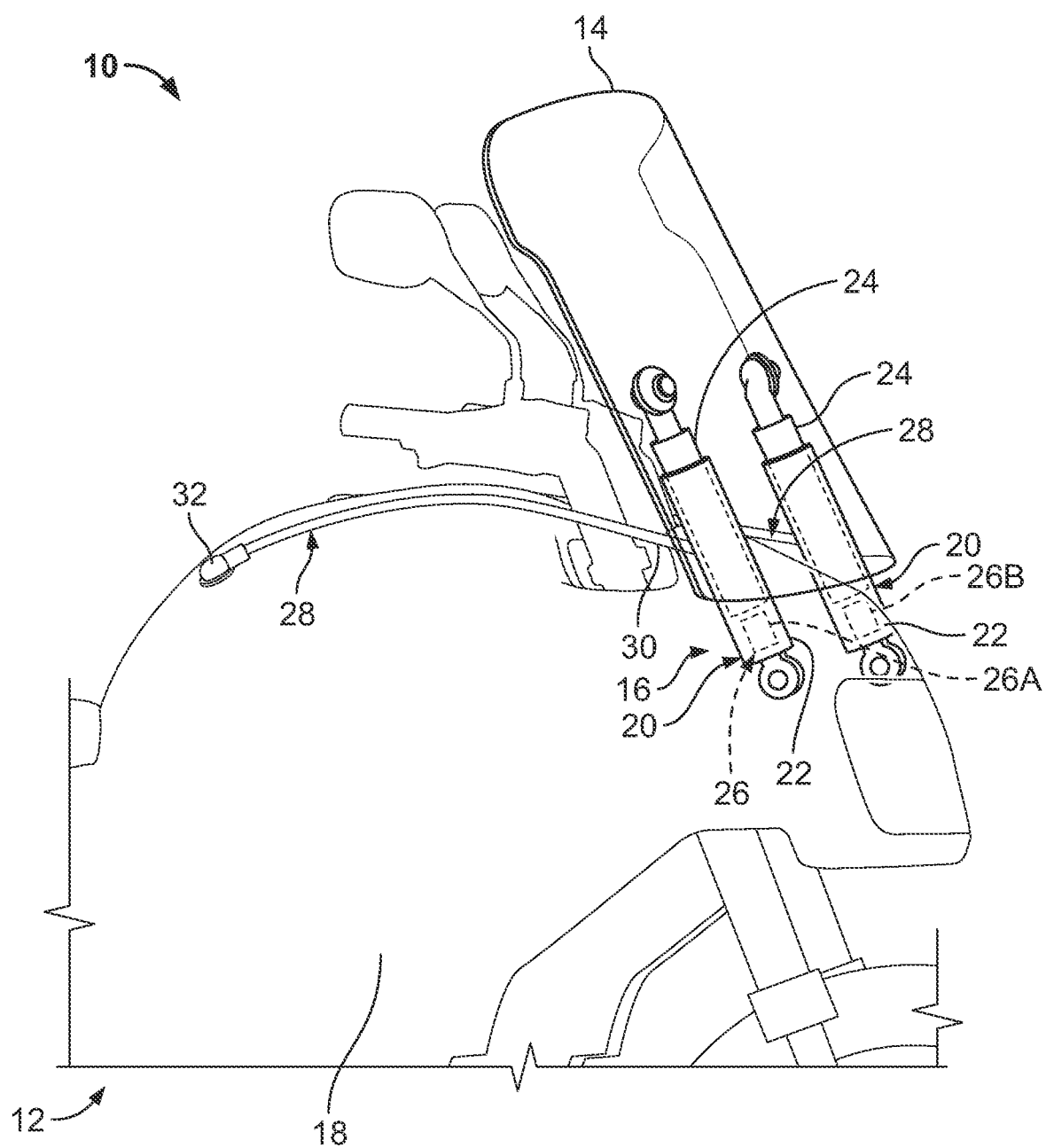
FIG. 1 is a perspective view of windscreen arrangement in accordance with the present teachings, a windscreen of the windscreen arrangement shown mounted to a motor vehicle and shown in a first position or normal use position.
Figure 2:
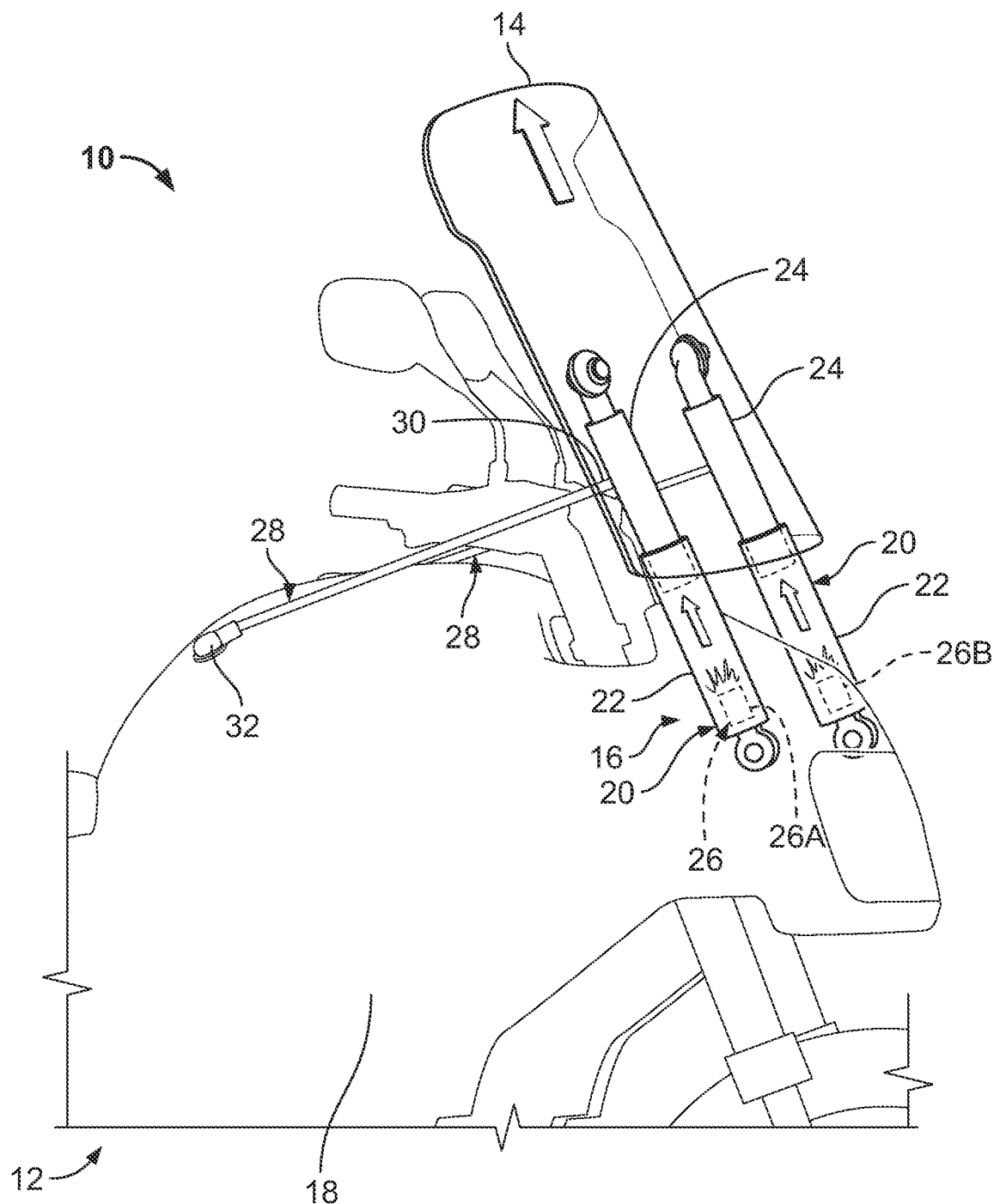
FIG. 2 is a perspective view similar to FIG. 1, the windscreen of the windscreen arrangement shown in a second position or deployed position for further protecting a rider of the motor vehicle in response to an accident event.

With general reference to FIGS. 1 and 2 of the drawings, a windscreen arrangement in accordance with the present teachings is illustrated and generally identified at reference character 10. In FIG. 1, the windscreen arrangement 10 is shown mounted to a motor vehicle 12 and a windscreen 14 of the windscreen arrangement 10 is shown in a first position or normal use position for deflecting wind and generally protecting a rider of the motor vehicle 12 under normal operating conditions. The windscreen 14 will be understood to operate in a substantially conventional manner in the normal use position of FIG. 1. In FIG. 2, the windscreen 14 is shown in a second position or deployed position for further protecting the rider of the motor vehicle 12 during various actual or anticipated collision events.

It will be understood that the motor vehicle 12 shown in drawings is exemplary. As illustrated, the present teachings are particularly adapted for use with powered two-wheelers and powered three-wheelers. The present teachings, however, may be readily adapted for use with other vehicles within the scope of the present teachings.

The windscreen arrangement 10 is illustrated to generally include a mounting arrangement 16 for mounting the windscreen 14 to a frame or body 18 of the motor vehicle 12 for deployment from the first position to the second position. The mounting arrangement 16 includes at least one telescoping assembly 20. In the embodiment illustrated, the mounting arrangement 16 includes first and second telescoping assemblies 20. Each telescoping assembly 20 includes first and second portions 22, 24 telescopically connected to one another. The first portions 22 of the telescoping assemblies 20 are mounted to the body 18 of the motor vehicle 12 and the second portions 24 of telescoping assemblies 20 are mounted to the windscreen 14.

The windscreen arrangement 10 of the present teachings is further illustrated to include a pyrotechnic arrangement 26 operative to automatically deploy the windscreen 14 from the first position to the second position in response to predetermined accident conditions. In the embodiment illustrated, the pyrotechnic arrangement 26 may include first and second gas generators 26A and 26B operatively associated with the first and second telescoping assemblies 20, respectively. The first and second gas generators 26A and 26B may be conventional micro gas generators (MGGs) that operate to generate gas that telescopically extends the second portions 24 of the telescoping assemblies 20 relative to the first portions 22 to deploy the windscreen 14. The first and second gas generators 26A and 26B may activate in response to a predetermined sensed accident event. Such sensing may be conducted in a conventional manner with conventional sensors carried on the vehicle 12.

The windscreen arrangement 10 may additionally include one or more tethers 28 extending between the body 18 of the motor vehicle 12 and the windscreen 14. In the embodiment illustrated, the windscreen arrangement 10 includes first and second tethers 28. Both tethers 28 include a first end 30 attached to the windscreen 14 and a second end 32 attached to the body 18 of the motor vehicle 12. The tethers 28 may operate to maintain a desired orientation of the windscreen 14 relative to the motor vehicle 12 upon deployment of the windscreen 14 to the second position.

During normal operation of the motor vehicle 12, the windscreen 14 remains in the first or normal use position (as shown in FIG. 1) and conventionally operates to deflect wind and provide a conventional degree of occupant protection. In the event of a predetermined accident condition, conventional sensors (not shown) on the motor vehicle 12 trigger the gas generators 26A and 26B to deploy the windscreen 14 from the first position to the second position (as shown in FIG. 2). In the second position, the windscreen 14 is upwardly displaced from the first position and the tethers 28 are drawn taut to maintain the windscreen 14 in a desired orientation relative to the motor vehicle 12. In the event of an impact, the windscreen 14 may operate to reduce occupant velocity and absorb occupant energy prior to contact with another vehicle or object.

Figure 3:
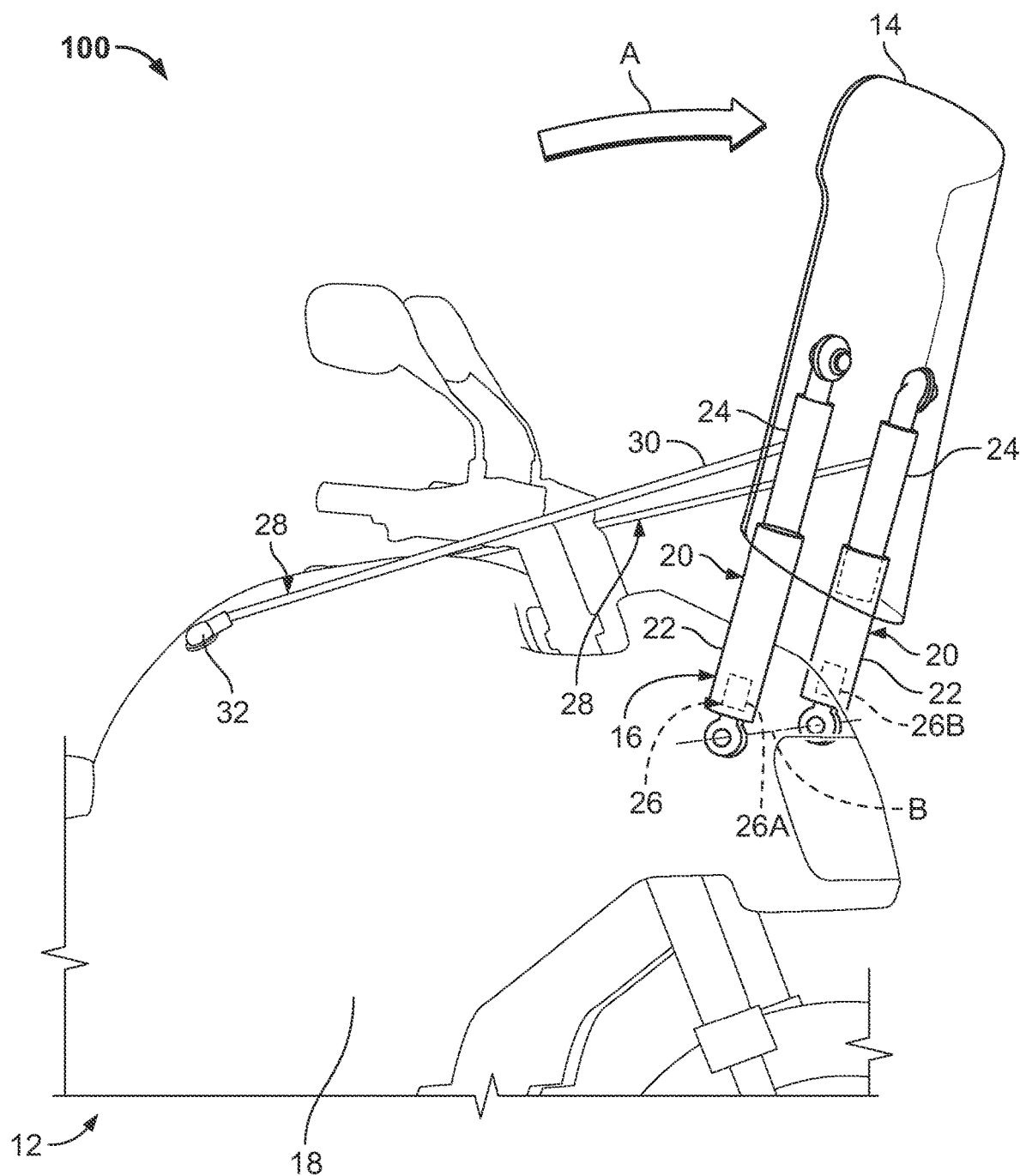
FIG. 3 is another perspective view similar to FIG. 1 illustrating another windscreen arrangement in accordance with the present teachings, the windscreen of the windscreen arrangement shown in a deployed position.

Turning to FIG. 3, another windscreen arrangement in accordance with the present teachings is illustrated and generally identified at reference character 100. Given the similarities between the windscreen arrangement 100 and the windscreen arrangement 10, like reference characters are used to identify similar features/elements. The windscreen arrangement 100 principally differs from the windscreen arrangement 10 in that the windscreen arrangement 10 is rotatably mounted to the body 18 of the motor vehicle 12. In this regard, the first portions 22 of the telescoping assemblies 20 are mounted to the body 18 of the motor vehicle 12 such that the windscreen 14 may rotate in a direction A. Rotation of the windscreen 14 is about an axis B passing through the mounting points for the telescoping assemblies 20. The lengths of the tethers 28 may be adjusted accordingly. In the event of an impact, the windscreen 14 deploys upwardly in a manner similar to the windscreen arrangement 10 and also rotates forwardly. In this manner, the occupant may slide along the angled windscreen 14 and may be directed upward and away from an object (e.g., another vehicle) impacted by the motor vehicle 12.

Figure 4:
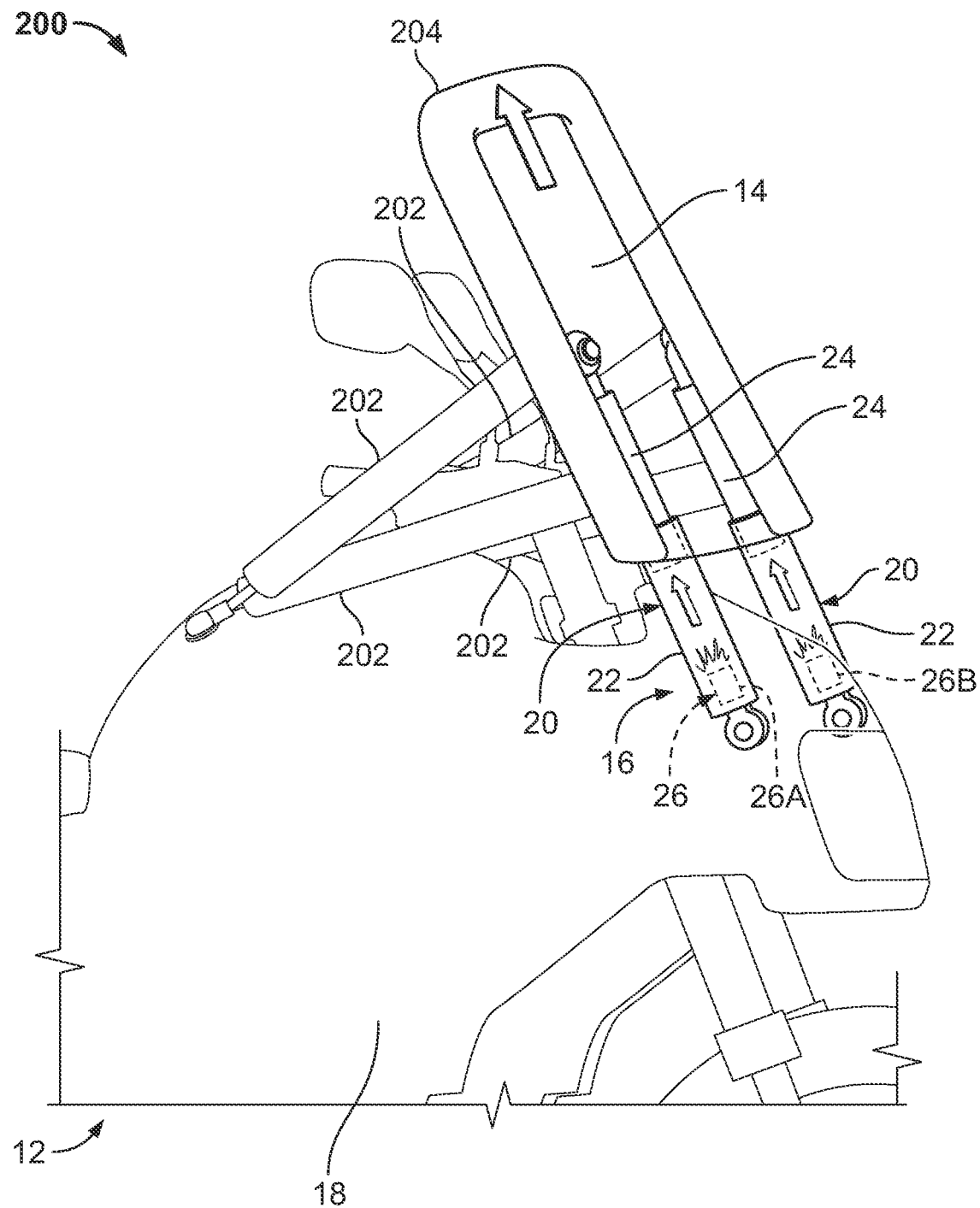
FIG. 4 is another perspective view similar to FIG. 1 illustrating another windscreen arrangement in accordance with the present teachings, the windscreen of the windscreen arrangement shown in a deployed position.

Turning to FIG. 4, another windscreen arrangement in accordance with the present teachings is illustrated and generally identified at reference character 200. Given the similarities between the windscreen arrangement 200 and the windscreen arrangement 10, like reference characters are again used to identify similar features/elements. The windscreen arrangement 200 principally differs from the windscreen arrangement 10 in that the windscreen arrangement 10 includes one or more inflatable tubes 202 and an inflatable cushion 204. These features may be individually used or jointly used within the scope of the present teachings.

In the embodiment illustrated, the windscreen arrangement 200 is shown to include four inflatable tubes 202. A greater or lesser number of inflatable tubes 202 may be used within the scope of the present teachings. The windscreen arrangement 200 may include non-inflatable tethers 28 in place of one or more of the inflatable tubes 202. The inflatable tubes 202 function in a manner similar to the tethers 28 discussed above to maintain a desired orientation of the windscreen 14 upon deployment. In this regard, each inflatable tube 202 includes a first end attached to the body 18 of the motor vehicle 12 and a second end attached to the windscreen 14. The inflatable tubes 202 may be inflated by an inflator through a gas guide (not specifically shown) and may function to provide further energy absorption.

The inflatable cushion 204 may be an inflatable curtain type cushion attached around a perimeter or frame of the windscreen 14. The inflatable cushion 204 is carried by the windscreen and shown deployed or inflated in FIG. 4. The inflatable cushion 204 extends about at least a portion of a perimeter of the windscreen. In the embodiment illustrated, the inflatable cushion extends along the lateral sides and top of the windscreen 14. The inflatable cushion 204 may be automatically inflated by inflation gases from the inflatable tubes 202 or from an independent inflator through a gas guide (not specifically shown) in response to sensing of a predetermined accident condition.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A windscreen arrangement for a motor vehicle, the windscreen arrangement comprising:
   a windscreen;
   a mounting arrangement for mounting the windscreen to a body of the motor vehicle for deployment from a first position to a second position, the second position being upwardly displaced from the first positions; and
   a pyrotechnic arrangement for deploying the windscreen from the first position to the second position, the pyrotechnic arrangement operative to automatically deploy the windscreen from the first position to the second position in response to a predetermined accident condition.

2. The windscreen arrangement of claim 1, wherein the mounting arrangement includes at least one telescoping assembly, each telescoping assembly of the at least one telescoping assembly having a first portion for mounting to the body of the motor vehicle and a second portion mounted to the windscreen.

3. The windscreen arrangement of claim 2, wherein the at least one telescoping assembly includes first and second telescoping assemblies.

4. The windscreen arrangement of claim 2, wherein the first portions of the first and second telescoping assemblies are rotatably mountable to the body of the motor vehicle such that the windscreen is rotatable relative to the body of the motor vehicle.

5. The windscreen arrangement of claim 2, in combination with the motor vehicle, the windscreen mounted to the body of the motor vehicle with the at least one telescoping assembly.

6. The windscreen arrangement and vehicle of claim 5, wherein the motor vehicle is selected from a group consisting of powered two wheelers and powered three wheelers.

7. The windscreen arrangement of claim 1, wherein the pyrotechnic arrangement includes a gas generator associated with each of the at least one telescoping assembly.

8. The windscreen arrangement of claim 1, further comprising at least one tether having a first end attached to the windscreen and a second end for attachment to the body of the motor vehicle.

9. The windscreen arrangement of claim 1, further comprising at least one inflatable tube having a first end attached to the windscreen and a second end for attachment to the body of the motor vehicle.

10. The windscreen arrangement of claim 1, further comprising an inflatable cushion carried by the windscreen and surrounding at least a portion of a perimeter of the windscreen.

11. A method of protecting an occupant of a powered two wheeler or a powered three wheeler with a windscreen arrangement, the windscreen arrangement including a windscreen and a mounting arrangement for mounting the windscreen to a body of the motor vehicle for deployment from a first position to a second position, the second position being upwardly displaced from the first position, the method comprising:
   automatically deploying the windscreen from the first position to the second position upon sensing of a predetermined accident event.

12. A windscreen arrangement in combination with a motor vehicle, the windscreen arrangement comprising:
   a windscreen;
   a mounting arrangement connecting the windscreen to a body of the motor vehicle for movement between a first position to a second position, the mounting arrangement including at least one telescoping assembly having a first portion mounted to a body of the motor vehicle and a second portion mounted to the windscreen; and
   a pyrotechnic arrangement for automatically deploying the windscreen from the first position to the second position in response to a predetermined accident event.

13. The windscreen arrangement in combination with a motor vehicle of claim 12, wherein the at least one telescoping assembly includes first and second telescoping assemblies.

14. The windscreen arrangement in combination with a motor vehicle of claim 12, wherein the pyrotechnic arrangement includes a gas generator associated with each of the at least one telescoping assembly.

15. The windscreen arrangement in combination with a motor vehicle of claim 12, wherein the first portions of the first and second telescoping assemblies are rotatably mountable to the body of the motor vehicle such that the windscreen is rotatable relative to the body of the motor vehicle.

16. The windscreen arrangement in combination with a motor vehicle of claim 12, further comprising at least one tether having a first end attached to the windscreen and a second end for attachment to the body of the motor vehicle.

17. The windscreen arrangement in combination with a motor vehicle of claim 12, further comprising at least one inflatable tube having a first end attached to the windscreen and a second end for attachment to the body of the motor vehicle.

18. The windscreen arrangement in combination with a motor vehicle of claim 12, further comprising an inflatable cushion carried by the windscreen and surrounding at least a portion of a perimeter of the windscreen.

* * * * *